Jan. 15, 1952     G. L. B. WAHLSTEN ET AL     2,582,300
MEANS FOR CONTROLLING TORQUE TRANSMISSION THROUGH
HYDRODYNAMIC TORQUE CONVERTERS
Filed Oct. 7, 1947

INVENTOR.
Gösta Ludwig Bertel Wahlsten
Gustav Karl William Borsted
BY
their Attorney Patented Jan. 15, 1952

2,582,300

UNITED STATES PATENT OFFICE 2,582,300

MEANS FOR CONTROLLING TORQUE TRANSMISSION THROUGH HYDRODYNAMIC TORQUE CONVERTERS

Gösta L. B. Wahlsten, Stockholm, and Gustav K. W. Boestad, Lidingo, Sweden, assignors, by mesne assignments, to Jarvis C. Marble, New York, N. Y., Leslie M. Merrill, Westfield, N. J., and Percy H. Batten, Racine, Wis., as trustees Application October 7, 1947, Serial No. 778,416
In Sweden, October 9, 1946

7 Claims. (Cl. 60—54)

The present invention relates to hydrodynamic torque converters of the kind in which working fluid is circulated in a closed circuit by a pump member located in the circuit together with a turbine member and suitable reaction elements.

When such converters are used for the transmission of power from a source to a power absorbing device, it is desirable to provide some means for interrupting the transmission of power in order to enable the engine or other source of power to operate idly or in order to bring into mesh or engagement mechanical means or the like which may be operatively connected with the converter.

These purposes can be attained by means of mechanical couplings, preferably of the friction type. Such couplings, however, are often too expensive and bulky to be used.

In order to effect a reduction of the torque transmitted from the pump shaft to the turbine shaft it has already been proposed to insert an annular screen or ring valve between the pump and the turbine. In this arrangement the circulation of fluid in the converter is interrupted but as a rule it is impossible to prevent a certain leakage which transmits a fractional portion of the torque and besides the friction between the side walls of the pump and the turbine causes a further transmission of torque, whereby the turbine shaft in spite of the insertion of the ring valve may rotate at too high a speed.

The present invention provides an improvement in torque converters of the kind under consideration, by means of which the flow of fluid from the pump to the turbine is interrupted through the medium of a valve ring the construction of which is such as to obviate the above mentioned disadvantages. In accordance with the invention a valve ring is provided that may be shifted from a position outside the circuit to a position in the circuit between the pump and turbine members, the valve ring being provided with apertures providing passages for flow of fluid to the turbine member in a direction such as to produce a torque acting on the turbine in a direction opposite that of the torque exerted on the turbine as a result of friction between the pump and turbine members and the flow of leakage fluid past the valve ring.

The passages in the ring valve are preferably given such a direction that the fluid passing through them is directed substantially in parallel with the main direction of the turbine blades at the outlet end. As the torque obtained according to the invention is opposed to the torque due to friction and leakage the invention provides a means to brake the rotation of the turbine shaft so that it will rotate at a very slow speed or be stalled or even obtain a slow rotative movement in the opposite direction.

Figure 1:
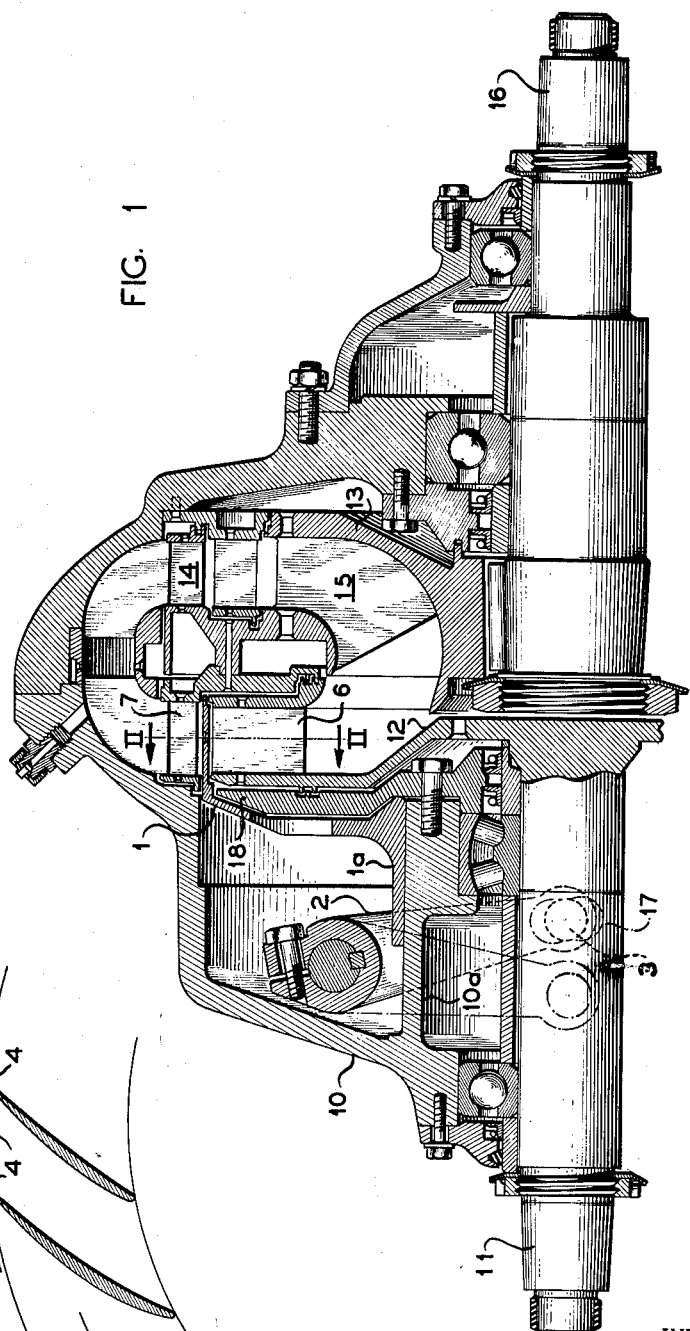
Fig. 1 shows a central longitudinal section through an hydraulic torque converter according to the invention.

In the apparatus according to Fig. 1 the reference 10 is the housing of the hydraulic converter. This housing surrounds a pump wheel 12, rigidly connected to a driving shaft 11, and a turbine wheel 13 which is connected to the driven shaft 16. The pump wheel 12 is provided with pump blades 6 and the turbine wheel 13 is provided with blade rows 7, 14 and 15. In the left hand portion of the housing there is arranged a ring valve 1 axially movable by means of the hub 1a on the cylindrical portion 10a of the housing. The cylindrical portion of the valve 1 is provided with a plurality of apertures providing passages 4. The position of the valve in relation to the pump blades 6 is regulated by means of the lever 2 which through the trunnion 3 cooperates with a slot 17 in the hub 1a. Between the pump disc 12 and the disc-formed portion of the ring valve 1 there is arranged a disc 18 with the object to lower the ventilating effect against the pump disc 12 when the valve 1 is in non-operative position.

The apparatus described operates as follows. When the torque transmission from the pump 6, 12 to the turbine 7, 14, 15, 13 is to be interrupted the valve 1 is moved to its operative position in which the valve with its annular portion cuts off the flow of fluid between the pump and the turbine. If it would be possible to make this cutting off complete the desired effect would be obtained. It is, however, impossible to cut off the flow of fluid completely as some clearances always are present through which the fluid can flow and due to fluid friction transmit a torgue from the side walls of the pump wheel to the surrounding surfaces of the turbine. This means that one will not succeed in bringing the turbine to a stall if no special measures are taken. As, according to the invention, the cylindrical portion of the ring valve is provided with passages 4 of adequate sectional area there will arise another flow of fluid, as is seen from Fig. 2, which flow will cause a torque counteracting the torque mentioned above because of the passages being directed against the front rim of the turbine blades and approximately in parallel with their rear or outlet end. By suitably dimensioning the sectional area of the passages it is possible to determine the strength of the fluid flow so that the turbine is brought to a stall or is given a slow rotation forwardly or backwardly. The gears in the mechanical torque converter or other machines can now readily be engaged. The power output for keeping the pump wheel idling at a low speed of rotation is at the same time reduced to a minimum.

Figure 2:
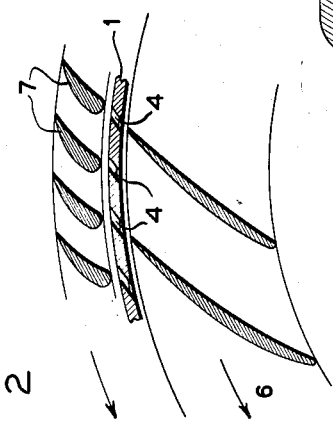
Fig. 2 shows a detail on an enlarged scale and in section along the line II–II of Fig. 1.

In order to give the desired effect the apertures providing the passages in the valve should be disposed so that their outermost or outlet ends are directed in the same way as the outlet edge of the blades of the next turbine ring, or, in other words, so that the discharge angle from the passages substantially coincides with the outlet angle of the turbine blades to which fluid from the passages is discharged. Fig. 2 shows the passages 4 in the ring valve 1, the reference 6 indicates the pump blades and 7 the first turbine blade row.

As above stated the total area of the ports in the ring valve is to be of such an order that the fluid passing therethrough will cause a torque about equal but oppositely directed to the torgues caused by the leakage and by friction. As in most cases the leakage area between the ring valve and the housing amounts to about 1% to 2% of the blade passage area in the first turbine ring after the ring valve it is in most cases sufficient to give said ports about the same total area of 1% to 2% of the blade passage area.

In some cases, however, it may be necessary to increase the total area of the ring valve ports to 2% to 4% of the blade passage area in order to meet other forwardly directed torgues, e. g., due to friction.

We claim:

1. A hydrodynamic torque converter of the closed circuit type comprising a pump member having a ring of pump blades and a turbine member having a ring of turbine blades to which fluid is discharged from said pump blades, means for interrupting flow of fluid from said pump blades to said turbine blades comprising a valve member movable from a position outside said circuit to a position in the circuit between said rings of blades, and means for counteracting flow of leakage fluid past said valve member and through said turbine blades comprising a plurality of apertures in said valve member, said apertures being positioned to discharge fluid to said ring of turbine blades in a direction producing torque on the turbine blades in a direction opposite the direction of the torque produced on the turbine member by said leakage fluid.

2. A hydrodynamic torque converter of the closed circuit type comprising a pump member having a ring of pump blades and a turbine member having a ring of turbine blades to which fluid is discharged from said pump blades, means for interrupting flow of fluid from said pump blades to said turbine blades comprising a valve member movable from a position outside said circuit to a position in the circuit between said rings of blades, and means for counteracting flow of leakage fluid past said valve member and through said turbine blades comprising a plurality of apertures in said valve member, said apertures being positioned to discharge fluid to said turbine blades at an angle substantially coinciding with the outlet angle of the turbine blades.

3. A hydrodynamic torque converter of the closed circuit type comprising a pump member having a ring of pump blades and a turbine member having a ring of turbine blades to which fluid is discharged from said pump blades, means for interrupting flow of fluid from said pump blades to said turbine blades comprising a valve member movable from a position outside said circuit to a position in the circuit between said rings of blades, and means for counteracting flow of leakage fluid past said valve member and through said turbine blades comprising a plurality of apertures in said valve member, said apertures being positioned to discharge fluid to said ring of turbine blades in a direction producing torque on the turbine blades in a direction opposite the direction of the torque produced on the turbine member by said leakage fluid and said apertures having an aggregate area constituting only a small fraction of the free flow area through said ring of turbine blades.

4. A hydrodynamic torque converter of the closed circuit type comprising a pump member having a ring of pump blades and a turbine member having a ring of turbine blades to which fluid is discharged from said pump blades, means for interrupting flow of fluid from said pump blades to said turbine blades comprising a valve member movable from a position outside said circuit to a position in the circuit between said rings of blades, and means for counteracting flow of leakage fluid past said valve member and through said turbine blades comprising a plurality of apertures in said valve member, said apertures being positioned to discharge fluid to said ring of turbine blades in a direction producing torque on the turbine blades in a direction opposite the direction of the torque produced on the turbine member by said leakage fluid in said apertures having an aggregate area within the range of from approximately 1% to 4% of the free flow area through said ring of turbine blades.

5. A hydrodynamic torque converter of the closed circuit type comprising a pump member having a ring of pump blades and a turbine member having a ring of turbine blades to which fluid is discharged from said pump blades, means for interrupting flow of fluid from said pump blades to said turbine blades comprising a valve member movable from a position outside said circuit to a position in the circuit between said rings of blades, and means for counteracting flow of leakage fluid past said valve member and through said turbine blades comprising a plurality of apertures in said valve member, said apertures being positioned to discharge fluid to said turbine blades at an angle substantially coinciding with the outlet angle of the turbine blades and said apertures having an aggregate area within the range of from approximately 1% to 4% of the free flow area through said ring of turbine blades.

6. A hydrodynamic torque converter of the closed circuit type comprising a rotationally stationary housing, a rotatably mounted pump member having a ring of pump blades, a rotatably mounted turbine member coaxial with the pump member and having a ring of turbine blades located radially outside the ring of pump blades, a valve member rotationally fixed and axially slidable on said stationary housing, said valve member having a cylindrical ring portion movable from a position outside said circuit to a position in the circuit between said rings of blades for interrupting flow of fluid from the pump blades to the turbine blades and said ring portion having a plurality of apertures therethrough for directing fluid against said turbine blades in a direction producing torque on the turbine blades in a direction opposed to the direction of the torque on the turbine blades resulting from flow of leakage fluid past said valve member, the aggregate area of said apertures being only a small fraction of the total area of the free flow area through said ring of turbine blades.

7. A hydrodynamic torque converter of the closed circuit type comprising a rotationally stationary housing, coaxial pump and turbine members rotatably mounted in said housing, said pump member comprising a generally radially extending disc portion carrying a ring of pump blades and said turbine member having a ring of turbine blades located radially outwardly of the pump blades and receiving fluid discharged from the latter, a valve member mounted on said housing structure, said member being rotationally fixed and axially shiftable and comprising a generally radially extending disc portion and an axially extending cylindrical portion at the outer perimeter of said disc portion, said cylindrical portion being movable from a position outside said circuit to a position in the circuit between said rings of pump and turbine blades, said cylindrical portion having a plurality of apertures aggregating only a small fraction of the free flow area through said ring of turbine blades for discharging fluid to the turbine blades in a direction producing torque on the turbine blades acting in a direction opposed to that produced by leakage fluid passing said valve member, and said housing including a disc-like partition portion located between the disc portions of the pump member and the valve member for reducing ventilation losses when the valve member is moved to a position outside said circuit.

GÖSTA L. B. WAHLSTEN.
GUSTAV K. W. BOESTAD.

REFERENCES CITED

The following references are of record in the file of this patent:

UNITED STATES PATENTS

| Number | Name | Date |
| --- | --- | --- |
| 2,255,430 | Lysholm et al. | Sept. 9, 1941 |
| 2,358,473 | Patterson | Sept. 19, 1944 |